W. O. WAKEFIELD.
HYDRAULIC MOTORS.
No. 183,346. Patented Oct. 17, 1876.
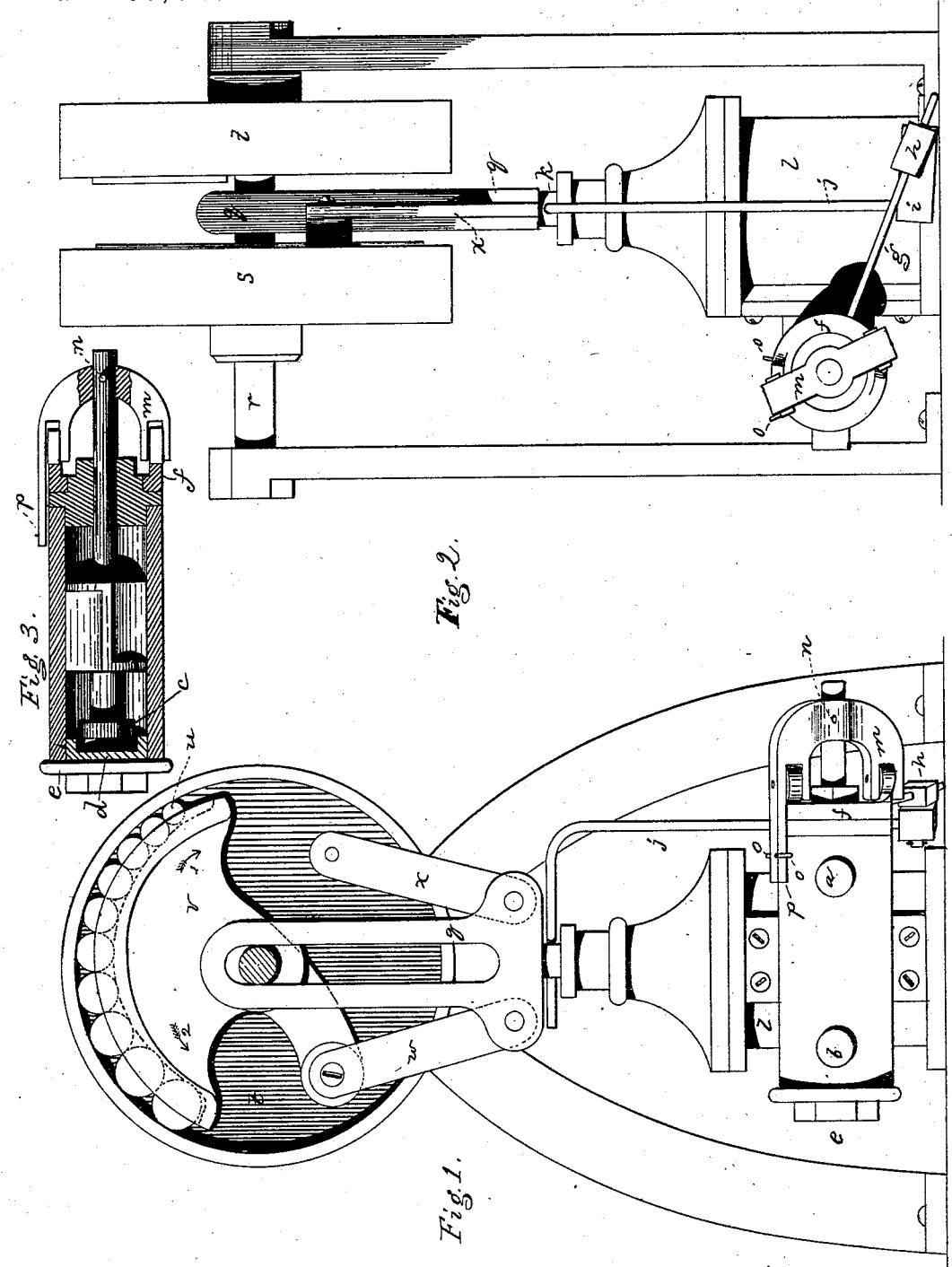
Witnesses:
L. H. Latimer
W. J. Pratt
Inventor:
William O. Wakefield
per Cowsby & Gregory Attys

UNITED STATES PATENT OFFICE.

WILLIAM O. WAKEFIELD, OF BOSTON, MASSACHUSETTS.

IMPROVEMENT IN HYDRAULIC MOTORS.

Specification forming part of Letters Patent No. 183,346, dated October 17, 1876; application filed July 24, 1876.

*To all whom it may concern:*

Be it known that I, WILLIAM O. WAKEFIELD, of Boston, in the county of Suffolk and State of Massachusetts, have invented an Improved Hydraulic Motor, of which the following is a specification:

This invention relates to hydraulic motors for blowing organs, and for other mechanical purposes where motors are required; and the invention consists in the combination, with a hydraulic piston and a driving or other shaft to be rotated, of friction clutches and pulleys by which to rotate such shaft, substantially as described; also, in the combination, with a pulley to be rotated, of a series of contiguous carriers and friction-rollers, to rotate the shaft from the piston, substantially as described; also, in a spindle and shifting cam-ring, combined to operate with a pivoted yoke and finger and stops, as hereinafter described; also, in the combination, with the shifting cam-ring and piston, of adjustably-connected connecting-rods, whereby the water may be cut at the desired time to regulate the throw of the piston, as hereinafter set forth.

Figure 1 represents, in side view, a hydraulic motor provided with my invention, the upper part being in section taken on line $x x$, Fig. 2. Fig. 2 is a front view, and Fig. 3 is a longitudinal section taken through the valve-cylinder.

A patent heretofore granted to me, No. 156,008, October 13, 1874, shows and describes a valve to be operated by water to control the passage of water to a main cylinder, to operate a piston of a hydraulic motor.

The valve herein shown is, in construction and operation, substantially like the valve shown in such patent. The valve-stem and quadrant-chambers, shifting cam-ring, and yoke are alike. In this instance the inlet is at $a$, and the outlet at $b$. At the exhaust end of the valve-stem is placed an auxiliary disk, $c$, that enters a chamber, $d$, at the inner side of the exhaust-head $e$, the two acting together, and forming a cushion to ease the stroke of the valve-stem in that direction. The shifting cam-ring $f$ has a rod, $g$, that enters a block, $h$, pivoted to a block, $i$, adjustably connected with a link, $j$, attached to the main piston $k$ of the hydraulic motor, the blocks $h$ and $i$ forming an adjustable connection for the rods $g j$, so as to cut off the water sooner or later, and increase or decrease the throw of piston $k$, or to cause it to be reciprocated over any portion of the length of its stroke, the piston of rod $k$, in its operations, moving either at the upper or lower or central portion of the cylinder $l$.

It is obvious that the piston may be operated in this way, and that the water will be cut off sooner or later by moving the blocks $h$ and $i$ of the adjustable connection on their rods $g j$.

The action of the cam-ring is constant and uniform, the length of the arm $g$ admitting of this through its connections with the piston $k$, and one of the cams, acting on a friction-roller carried by the yoke $m$, pivoted to the valve-stem at $n$, forces the yoke and valve-stem and its chambered valve outward, one of the stops $o\ o$ (the one against which the finger $p$ of the yoke then rests) preventing the chambered valve from turning. As the chambered valve and its stem return to their backward position under the pressure of the water, they are rotated through the action of the yoke on the cam projections of the cam-ring, the finger $p$ then moving from the stop against which it was held when the valve moved out to a position toward the opposite stop $o$. This oscillation or partial rotation of the chambered valve reverses the ports and the flow of water, all in the usual way.

In the patent referred to the yoke was fixed to the valve-rod, and the finger was a spring-finger; but in this instance the finger is made heavier and has more strength, and the yoke is pivoted to the valve-stem.

This construction makes it unnecessary to finish the cam-ring as true as heretofore, for any irregularity of the cam-ring will be compensated for by the movement of the yoke on its pivot.

The finger $p$ does not strike against the pins with a blow, but meets the pins easily through the action of the cam-ring, the cams not being long enough to carry the finger over from one to the other pin. A slotted bar, $q$, at the end of the piston-rod $k$ embraces the shaft $r$, which is to have rotary motion imparted to it from the reciprocating piston $k$.

On this shaft are fixed two pulleys, s t, provided with flanges, the interiors of which are engaged by friction-rollers u u, of gradually-decreasing size, commencing with the roller at the left of Fig. 1, and placed in contact one with the other in a channel or way made in the face of a carrier, v. (See dotted lines, Fig. 1.) The surface upon which these rollers rest is eccentric with relation to the interior of the rim of the pulley, thereby permitting the rollers to vary in size. The carrier v is mounted loosely on the shaft r, and is connected by link w with the slotted guide-bar q, and the carrier is therefore vibrated at each reciprocation of the piston. When the carrier is moved in the direction of arrow 1, Fig. 1, the rollers do not engage and move the pulley t, for they are crowded into the largest portion of the groove in the carrier; but when the carrier moves in the direction of arrow 2, the rollers are wedged firmly between the carrier and pulley-rim, and the pulley and shaft then move with the carrier. A link, x, is connected with a second carrier, v, (not shown, but placed within pulley s,) the second carrier v and its rollers being in all particulars like the carrier v and rollers shown in Fig. 1. The two carriers and rollers do not, however, operate to engage and move the pulleys at the same time; but, on the contrary, they are so placed and connected that when one carrier and its rollers is moving its pulley and the shaft r in one direction, the other carrier is returning to its starting-point, and does not then engage its pulley. This alternate operation of carriers and rollers enables one or the other pulley to be at all times engaged and moved positively, and the shaft r is therefore moved continuously.

A series of rollers, ten being shown in the series, enables the interior of the pulley-rim to be engaged very positively, and over a large portion of its surface, and the strain on the pulley at its points of engagement with the rollers is distributed over a large arc of the rim, whereas, if but one roller were used, the strain would be considerable, and the frictional contact not so certain or easy.

I am aware that it is common to use a single roller in an inclined cavity of a hub, and that I do not claim; but, by reason of the series of rollers arranged contiguous to each other, as shown, it is apparent that the rollers are made self-acting as to compensating for wear, for as the rollers are worn they gradually descend toward the end 3 of the carrier, and when the smallest roller is worn too small for effective use it drops out, the next roller of the series taking its place.

In practice the carriers are made of hard metal, and the rollers of a softer metal, and the rollers therefore take nearly all the wear, and do not cut into the carrier, which is a matter of great importance, for if the carrier becomes worn the rolls are not properly held up, and cannot properly engage and move the pulley.

A single hydraulic piston connected with a crank-shaft cannot pass the shaft over its dead-center without the assistance of the fly-wheel, and without greatly straining the shaft and moving parts at each rotation; but by interposing two friction connections between the piston of a hydraulic motor and the shaft to be driven, all strain because of the inelasticity of the water is obviated, and the stroke of the piston may be made variable, and there is no dead-center.

This machine runs quietly and easily without the use of an air-chamber or a fly-wheel.

I do not herein broadly claim the carrier and series of contiguous rollers of graduated sizes, as such devices are to be made the subject of another application.

I claim—

1. A hydraulic cylinder and reciprocating piston, and a shaft to be driven from the piston, in combination with two pulleys and carriers and friction-rollers to rotate the shaft continuously from the piston, substantially as described.

2. The combination, with the pulley, of the carrier and series of contiguous rollers of graduated sizes, substantially as described.

3. The valve-spindle and shifting cam-ring, in combination with the pivoted yoke and its finger and stops, substantially as described.

4. The shifting cam-ring and piston, in combination with connecting-rods g j, and an adjustable connection between the rods, substantially as and for the purpose set forth.

5. A hydraulic piston and cylinder, and a valve mechanism changed to reverse its ports through the action of the piston, in combination with a shaft provided with two pulleys, and with two carriers and series of friction-rollers, substantially as described.

In testimony whereof I have signed my name to this specification in the presence of two subscribing witnesses.

WILLIAM O. WAKEFIELD.

Witnesses:
  G. W. GREGORY,
  S. B. KIDDER.